United States Patent
Frey et al.

(10) Patent No.: US 11,194,301 B2
(45) Date of Patent: Dec. 7, 2021

(54) SYSTEM FOR POWER RECOVERY FROM QUENCH AND DILUTION VAPOR STREAMS

(71) Applicant: UOP LLC, Des Plaines, IL (US)

(72) Inventors: Stanley J. Frey, Palatine, IL (US); Keith A. Couch, Arlington Heights, IL (US); Donald A. Eizenga, Elk Grove Village, IL (US); James W. Harris, Palatine, IL (US); Thomas A. Ebner, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 249 days.

(21) Appl. No.: 16/355,191

(22) Filed: Mar. 15, 2019

(65) Prior Publication Data

US 2019/0286081 A1 Sep. 19, 2019

Related U.S. Application Data

(60) Provisional application No. 62/644,104, filed on Mar. 16, 2018.

(51) Int. Cl.
*F02C 3/28* (2006.01)
*C01B 3/38* (2006.01)
(Continued)

(52) U.S. Cl.
CPC .............. *G05B 15/02* (2013.01); *G06N 5/02* (2013.01)

(58) Field of Classification Search
CPC ........ G06N 5/02; G06N 20/00; G05B 19/402; G05B 15/02; G06F 17/11;
(Continued)

(56) References Cited

U.S. PATENT DOCUMENTS

| 4,285,481 A | 8/1981 | Biscomb |
| 4,455,614 A | 6/1984 | Martz et al. |

(Continued)

FOREIGN PATENT DOCUMENTS

| CN | 102203780 A | 9/2011 |
| CN | 103917280 A | 7/2014 |

(Continued)

OTHER PUBLICATIONS

Hakimi et al., Optimization of a reliable combined cooling, heat and power microgrid system, 6 pages (Year: 2013).*

(Continued)

*Primary Examiner* — Thuy Dao

(57) ABSTRACT

A process for reducing pressure of a vapor stream wherein the vapor stream rotates a turbine wheel within the turbine to transmit rotational movement to an electrical generator and generate electricity. The resulting lower pressure vapor stream reduces a partial pressure of a hydrocarbon vapor or is injected into a reactor to reduce a temperature in the reactor. A recovered electric power measuring system comprises at least one processor; at least one memory storing computer-executable instructions; and at least one receiver configured to receive data from a sensor on an electrical powerline connected to a generator of a turbine, the turbine in fluid communication with a vapor stream wherein the turbine reduces the pressure of the vapor stream and the resulting lower pressure vapor stream is injected into a reactor to reduce a temperature in the reactor or to reduce a partial pressure of hydrocarbon vapor in the reactor.

18 Claims, 4 Drawing Sheets

(51) Int. Cl.
*F02C 6/18* (2006.01)
*C01B 3/00* (2006.01)
*F02C 3/20* (2006.01)
*G05B 15/02* (2006.01)
*G06N 5/02* (2006.01)

(58) Field of Classification Search
CPC ........ B64C 2201/108; B64C 2201/027; B64C 39/024; Y02E 20/16; Y02E 20/14; Y02E 20/06; Y02E 20/129; Y02E 20/18; Y02P 20/129
See application file for complete search history.

(56) References Cited

U.S. PATENT DOCUMENTS

| | | | |
|---|---|---|---|
| 4,743,356 A * | 5/1988 | Soderberg | C10G 47/30 208/101 |
| 5,384,489 A | 1/1995 | Bellac | |
| 6,265,453 B1 | 7/2001 | Kennedy | |
| 6,681,155 B1 | 1/2004 | Fujita et al. | |
| 6,898,540 B2 | 5/2005 | Davies | |
| 7,757,493 B2 | 7/2010 | Bell et al. | |
| 7,948,101 B2 | 5/2011 | Burtch | |
| 8,404,918 B2 | 3/2013 | Frey | |
| 8,510,015 B2 | 8/2013 | Beausoleil et al. | |
| 8,763,625 B1 | 7/2014 | Carter | |
| 8,967,590 B2 | 3/2015 | Minervini et al. | |
| 9,085,499 B2 | 7/2015 | Frey et al. | |
| 9,235,228 B2 | 1/2016 | Gazit et al. | |
| 9,764,272 B2 | 9/2017 | Martin et al. | |
| 2003/0120444 A1 * | 6/2003 | Zison | G01N 33/0031 702/81 |
| 2005/0034463 A1 | 2/2005 | Simpson et al. | |
| 2008/0015839 A1 | 1/2008 | Noureldin et al. | |
| 2009/0125152 A1 | 5/2009 | Skowronski et al. | |
| 2009/0173079 A1 * | 7/2009 | Wallace | C10J 3/86 60/780 |
| 2011/0077448 A1 | 3/2011 | Frey | |
| 2011/0100004 A1 | 5/2011 | Al-Mazeedi | |
| 2012/0107227 A1 | 5/2012 | Fischer et al. | |
| 2012/0118526 A1 | 5/2012 | Sudau et al. | |
| 2012/0227440 A1 | 9/2012 | Guidati et al. | |
| 2012/0245754 A1 | 9/2012 | Mehnert | |
| 2012/0260667 A1 | 10/2012 | Chillar et al. | |
| 2012/0292909 A1 * | 11/2012 | Eriksen | E21B 41/0085 290/52 |
| 2012/0326443 A1 | 12/2012 | Ginter et al. | |
| 2013/0199185 A1 | 8/2013 | Wain et al. | |
| 2014/0052426 A1 * | 2/2014 | Pandey | F01K 13/02 703/6 |
| 2014/0291201 A1 | 10/2014 | Banerjee et al. | |
| 2014/0331672 A1 | 11/2014 | Filippi et al. | |
| 2015/0096309 A1 * | 4/2015 | Mathur | B01J 8/0285 62/62 |
| 2015/0118131 A1 * | 4/2015 | Martin | F03B 15/20 423/210 |
| 2015/0122243 A1 * | 5/2015 | Galloway | C10G 2/332 126/263.01 |
| 2016/0079756 A1 | 3/2016 | Ikeyama et al. | |
| 2016/0141878 A1 | 5/2016 | Johansen | |
| 2016/0161536 A1 | 6/2016 | Amminudin | |
| 2016/0252015 A1 | 9/2016 | Kusumi et al. | |
| 2016/0258363 A1 * | 9/2016 | Tiwari | F02C 6/18 |
| 2016/0319198 A1 | 11/2016 | Quanci et al. | |
| 2016/0348013 A1 * | 12/2016 | Ladkat | C10G 45/02 |
| 2017/0058206 A1 | 3/2017 | Noureldin et al. | |
| 2017/0058207 A1 | 3/2017 | Noureldin et al. | |
| 2017/0114660 A1 * | 4/2017 | James | F02D 41/26 |
| 2017/0201158 A1 * | 7/2017 | Lear | F02G 5/02 |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| RU | 2014114067 | 10/2015 |
| WO | 2014119569 A1 | 8/2014 |
| WO | 2014178079 A2 | 11/2014 |
| WO | 2016177376 A1 | 11/2016 |

OTHER PUBLICATIONS

Tsourapas, Vasilios, Control Analysis of Integrated Fuel Cell Systems with Energy Recuperation Devices, 2007.
The Elliot Group, Maximize the Efficiency of your Steam Process, 2014.
Mechanical Solutions, Inc., Replacing a Pressure Reducing Valve with a Hydro Turbine for a Municipal Water Supply, Jul. 19, 2016.
Frey, Stanley Joseph, et al., U.S. Appl. No. 15/923,990, filed Mar. 16, 2018 and entitled "Turbine with Supersonic Separation ".
Frey, Stanley J., et al., U.S. Appl. No. 62/644,086, filed Mar. 16, 2018 and entitled "System for Consolidation and Use of Power Recovered from A Turbine in a Process Unit".
Frey, Stanley Joseph, et al., U.S. Appl. No. 15/924,037, filed Mar. 16, 2018 and entitled "Power Recovery from Quench and Dilution Vapor Streams".
Frey, Stanley J., U.S. Appl. No. 15/923,936, filed Mar. 16, 2018 and entitled "Energy-Recovery Turbines for Gas Streams".
Frey, Stanley J., et al., U.S. Appl. No. 15/923,945, filed Mar. 16, 2018 and entitled "Consolidation and Use of Power Recovered from a Turbine in a Process Unit".
Frey, Stanley J., et al., U.S. Appl. No. 15/923,964, filed Mar. 16, 2018 and entitled "Process Improvement through the Addition of Power Recovery Turbine Equipment in Existing Processes".
Frey, Stanley Joseph, et al., U.S. Appl. No. 15/923,997, filed Mar. 16, 2018 and entitled "Processes for Adjusting at Least One Process Condition of a Chemical Processing Unit with a Turbine ".
Frey, Stanley Joseph, et al., U.S. Appl. No. 15/923,978, filed Mar. 16, 2018 and entitled "Hydroprocessing Unit with Power Recovery Turbines".
Harris, James W., et al., U.S. Appl. No. 15/923,995, filed Mar. 16, 2018 and entitled "Steam Reboiler with Turbine".
Harris, James W., et al., U.S. Appl. No. 15/924,034, filed Mar. 16, 2018 and entitled "Use of Recovered Power in a Process".

* cited by examiner

SYSTEM FOR POWER RECOVERY FROM QUENCH AND DILUTION VAPOR STREAMS

RELATED APPLICATIONS

This application claims priority to U.S. Provisional Patent Application No. 62/644,104 filed on Mar. 16, 2018, the entirety of which is incorporated herein by reference.

FIELD OF THE INVENTION

This invention relates generally to vapor streams that are used in a chemical processing or refining plant as a dilution fluid or a quench fluid, and more particularly to processes wherein such vapor streams pass through a turbine to lower a pressure of the vapor stream and recover energy from the pressure reduction. A recovered electric power measuring system comprises at least one processor; at least one memory storing computer-executable instructions; and at least one receiver configured to receive data from a sensor on an electrical powerline connected to a generator of a turbine, the turbine in fluid communication with a vapor stream wherein the turbine reduces the pressure of the vapor stream and the resulting lower pressure vapor stream is injected into a reactor to reduce a temperature in the reactor or to reduce a partial pressure of hydrocarbon vapor in the reactor

BACKGROUND OF THE INVENTION

Chemical refining and processing methods frequently utilize diluent or quench fluids which added to help promote reaction(s) and/or control temperature(s). Exemplary reactors that utilize these types of vapor streams include petroleum refining fluidized catalytic cracking "FCC" reactors and hydroprocessing reactors. In reactors, the lowest temperature of the diluent or quench vapor streams is occasionally limited by the dew point of the vapor stream.

In an FCC reactor, steam is added to the transport reactor to transport catalyst, as a working fluid for feed atomization and distribution, as a stripping media to remove hydrocarbons from the catalyst prior to regeneration and to reduce the partial pressure of the lower molecular weight products thereby relieving equilibrium for cracking and promoting higher conversion. Steam is used commonly for dilution in process operations often to reduce the partial pressure of hydrocarbon to promote vaporization or forward reaction in mole generating reactions as in FCC. The use of steam is to provide a gaseous material that is easily condensed and removed after its use. Many times, in the case of FCC, it is advantageous to have the steam as close to dew point as possible since the added energy is detrimental to the performance of the unit. The flow of hot catalyst added to the reactor is limited by maximum reactor temperatures promoting thermal cracking. Due to the usually high pressure drop from steam supply to the reactor riser, the steam enters with a large amount of superheat unnecessarily producing a reactor temperature higher than what might be possible with a steam source with less superheat. This limits the hot catalyst circulation rate and tends to give more unwanted thermal cracking versus catalytic cracking.

In a hydroprocessing reactor, the catalyst beds are often separated into multiple beds due to the highly exothermic nature of hydroprocessing and the need to quench the reactions and control the temperature. Between the different reactor beds, a relatively low temperature (compared to the process) hydrogen-containing vapor stream is added to quench the reactor temperature before the process fluid enters the next bed catalyst. The use of the hydrogen-containing vapor stream requires energy as the quench stream is compressed. The hydroprocessing unit throughput is often limited by flow of quench hydrogen to keep the reactor catalyst bed temperatures in a safe range.

In either conventional hydroprocessing or FCC reactors, the quench or dilution streams often passes through a control valve to control the flow of these vapor streams. While these conventional systems are presumably effective for their intended purposes, the control valves result in a loss of mechanical energy. Specifically, since the energy removed, via the pressure reduction, is dissipated without recovery by the control valve, the energy is lost. Additionally, because the energy removed often is a result of energy added to the system, the lost energy can represent a higher operating cost. This lost energy results in minimal temperature reduction versus the pressure reduction via an adiabatic pressure reduction across the control valve.

Therefore, there is a need for an effective and efficient device and process for recovery of this lost energy associated with such quench or dilution vapor streams in addition to a method to shift more of the energy reduction to temperature reduction versus pressure reduction.

SUMMARY OF THE INVENTION

The present invention provides devices and processes that overcomes one or more shortcomings associated with the prior art.

A recovered electric power measuring system comprising at least one processor; at least one memory storing computer-executable instructions; and at least one receiver configured to receive data from a sensor on an electrical powerline connected to a generator of a turbine, the turbine in fluid communication with a vapor stream wherein the turbine reduces the pressure of the vapor stream and the resulting lower pressure vapor stream is injected into a reactor to reduce a temperature in the reactor or to reduce a partial pressure of hydrocarbon vapor in the reactor. The system may further comprise an input/output device to collect the data. The processor may be configured to evaluate the data. The processor may be configured to correlate the data. The system may further comprise a transmitter to transmit a signal to the recovered electric power measuring system. The signal may comprise instructions. The signal may be transmitted to the recovered electric power measuring system. The system may further comprise comprising receiving data from multiple systems wherein one system is the recovered electric power measuring system. The processor may be further configured to generate predictive information, regulatory information, or both. The turbine may comprise a sensor. The at least one receiver may be further configured to receive data of time or day or both. The processor may be further configured to generate quantitative information and may be still further configured to correlate the quantitative information with the data of time or day or both.

A method for collecting data from a recovered electric power measuring system, the method comprising receiving data from a sensor on an electrical powerline connected to a generator of a turbine, the turbine in fluid communication with a vapor stream wherein the turbine reduces the pressure of the vapor stream and the resulting lower pressure vapor stream is injected into a reactor to reduce a temperature in the reactor or to reduce a partial pressure of hydrocarbon vapor in the reactor. The method may further comprise at least one of displaying, or transmitting, or analyzing the received data. The method may further comprise analyzing the received data to generate at least one instruction and transmitting the at least one instruction. The method may further comprise analyzing the received data and generating predictive information. The predictive information may comprises catalyst performance or catalyst selectivity or catalyst life or any combination thereof.

Specifically, according to the present invention, the control valve is replaced with a turbine. By using a turbine, instead of control valve, the same or more energy removal to lower the pressure is achieved with a greater reduction in temperature following a more isentropic process than with a control valve. A turbine in the quench or dilution stream changes the reduction of pressure from an adiabatic operation (valve with hot outlet temperature) to an isentropic operation where energy is extracted in the way of work on a shaft thereby producing a lower temperature output while optionally generating power from the pressure let down. Alternatively, the energy could be dissipated by a brake or other device in case the electricity recovery is not valued highly versus the process improvement.

In the case of an FCC unit, having a dilution stream nearer its dew point will reduce the riser heat input allowing more heat to be added by increased catalyst circulation and providing more selective cracking to desired LPG and naphtha components. In the case of a hydroprocessing reactor, less hydrogen will be required in the quench vapor streams, resulting in lower energy use in the recycle gas compressor, and/or allowing more hydrogen to be injected into the inlet of the reactor—promoting longer first bed catalyst life and higher hydrogenation in each bed but the last. At fixed hydrogen flow, the cooler hydrogen allows more hydrocarbon charge to the reactor as more of the heat of reaction is cooled with the same flow of now cooler hydrogen. Additionally, in addition to the foregoing benefits, the turbines convert the removed energy into electrical energy to be utilized elsewhere. Thus, the turbines provide an additional advantage over the control valves currently used with the dilution and quench streams.

Therefore, in at least one aspect, the present invention may be characterized, as providing a process for reducing pressure of a vapor stream used for reducing a temperature, a heat load, or a hydrocarbon partial pressure in a reactor by: reducing a pressure of a vapor stream with a turbine to provide a lower pressure vapor stream; rotating a turbine wheel within the turbine; injecting the lower pressure vapor stream into a reactor in order to reduce a temperature or total heat injection to the reactor or reduce a partial pressure of a hydrocarbon vapor in the reactor.

In another aspect, the present invention may be characterized, as providing a process for reducing pressure of a vapor stream used for adjusting a partial pressure of a hydrocarbon vapor by: providing a vapor stream comprising steam; passing the vapor stream through a turbine, the turbine comprising a turbine wheel within the turbine, the turbine wheel optionally configured to transmit rotational movement to an electrical generator; recovering a reduced pressure vapor stream from the turbine; and, reducing a partial pressure of a hydrocarbon vapor by mixing the reduced pressure vapor stream with the hydrocarbon vapor.

Further, in yet another aspect, the present invention may be characterized, as providing a process for reducing pressure of a vapor stream used as a quench stream by: providing a vapor stream comprising hydrogen; passing the vapor stream through a turbine, the turbine comprising a turbine wheel within the turbine, the turbine wheel optionally configured to transmit rotational movement to an electrical generator; recovering a reduced pressure vapor stream from the turbine; and, controlling a temperature within a reactor with the reduced pressure vapor stream from the turbine.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures in which.

DETAILED DESCRIPTION OF THE INVENTION

As mentioned above, the present utilizes one or more turbines to reduce the pressure and temperature through a nearly isentropic means and optionally recover energy from a quench or dilution vapor stream in a chemical processing unit. The optionally recovered energy, in the form of electrical energy, is, for example, used elsewhere in the processing unit. It is contemplated that power recovery turbines are installed on these high-power let downs of hydrogen and steam into the reactors thereby generating value from the energy recovered in addition to increasing reactor conversion or throughput and reducing specific product energy intensity by allowing a lower hydrogen circulation rate, higher feed rate (throughput), or increased conversion.

With these general principles in mind, one or more embodiments of the present invention will be described with the understanding that the following description is not intended to be limiting.

Figure 1:
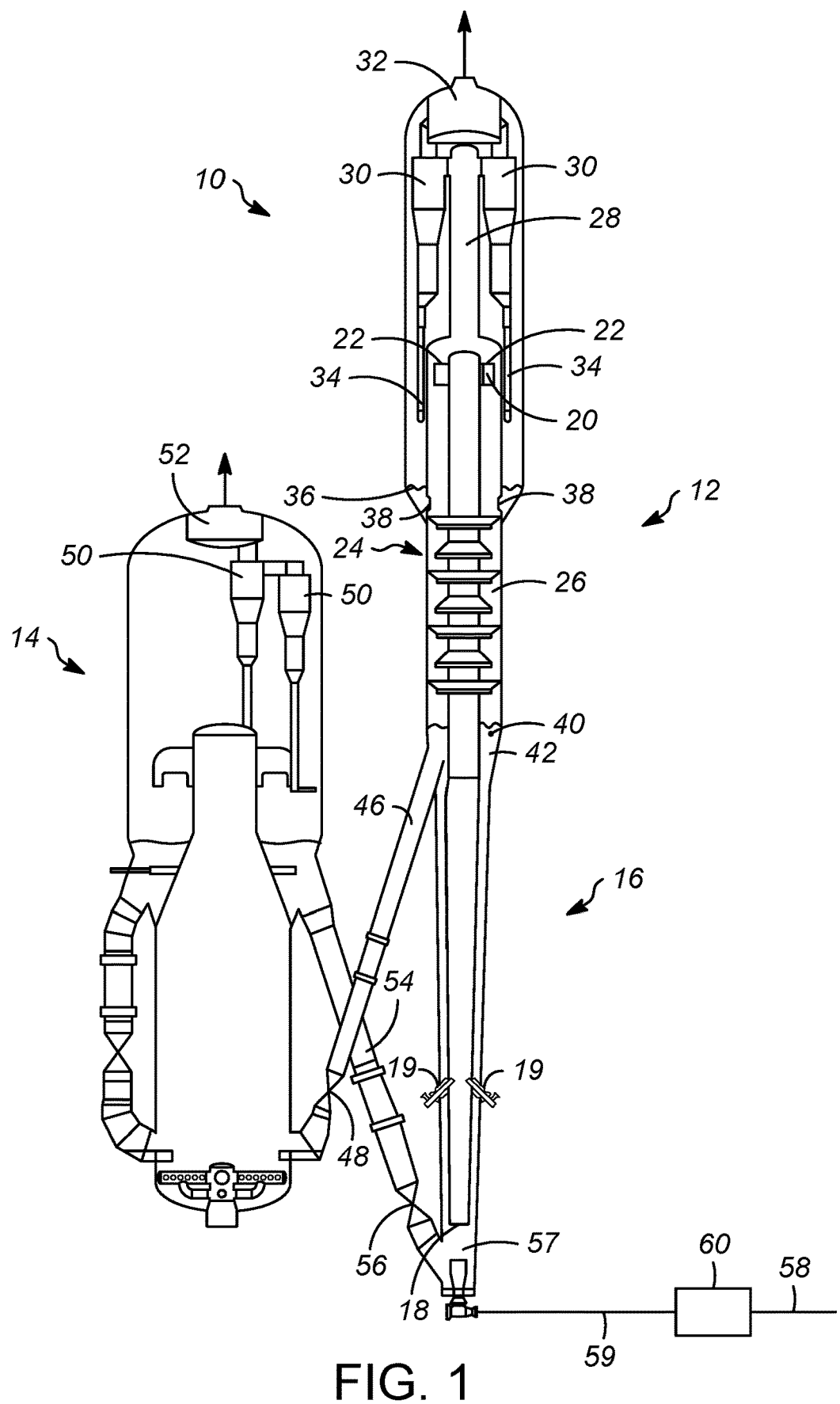
FIG. 1 shows an FCC reactor used in accordance with one or more embodiments of the present invention.

Turning to FIG. 1, in various aspects of the present invention, the turbine is used in a dilution stream associated with an FCC unit 10. The description of this invention in the context of the specific FCC unit 10 shown is not meant to limit the present invention to the details disclosed therein.

The FCC unit 10 shown in FIG. 1 includes, generally, a separator vessel 12, a regenerator 14, and a vertical riser 16. The FCC unit 10 circulates catalyst and contacts feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as an Y-type zeolite, an active alumina material, a binder material, comprising either silica or alumina and an inert filler such as kaolin. A catalyst additive may comprise a medium or smaller pore zeolite catalyst exemplified by ZSM-5, ZSM-11, ZSM-12, ZSM-23, ZSM-35, ZSM-38, ZSM-48, and other similar materials.

FCC feedstocks include conventional FCC feeds and higher boiling or residual feeds. The most common of the conventional feeds is a vacuum gas oil which is typically a hydrocarbon material having a boiling range of from 343° to 552° C. (650° to 1025° F.) and is prepared by vacuum fractionation of atmospheric residue. Heavy or residual feeds, i.e., boiling above 499° C. (930° F.), are also suitable.

Looking then at FIG. 1, the riser 16 provides a conversion zone for cracking of hydrocarbons in the feedstock. The residence time for the feed in contact with the catalyst in the riser 16 may be less than or equal to 3 seconds. Any residence time of less than or equal to 3 seconds may be preferred depending on the desired product distribution. The shorter residence time assures that the desired products once obtained do not convert to undesirable products. Notwithstanding the foregoing, different residence times may be utilized as will be appreciated by those of ordinary skill in the art.

The feedstock is introduced into the riser 16 by one or more distributors or nozzles 19 between an inlet 18 to the riser 16 and substantially upstream from an outlet 20. Volumetric expansion resulting from the rapid vaporization of the feedstock as it enters the riser 16 further decreases the density of the catalyst within the riser to typically less than 160 kg/m$^3$ (10 lb/ft$^3$). Before contacting the catalyst, the feedstock will ordinarily have a temperature in a range of from 149° to 316° C. (300° to 600° F.). Additional amounts of feedstock may be added downstream of the initial feed point of the distributors 19.

The blended catalyst and reacted feed vapors are then discharged from the top of riser 16 through the outlet 20 and separated into a cracked product vapor stream including olefins and a collection of catalyst particles covered with substantial quantities of coke and generally referred to as "coked catalyst." In an effort to minimize the contact time of the feedstock and the catalyst which may promote further conversion of desired products to undesirable other products, any arrangement of separators to remove coked catalyst from the product stream quickly is used.

In particular, a swirl arm arrangement 22, provided at the end of riser 16 can further enhance initial catalyst and cracked hydrocarbon separation by imparting a tangential velocity to the exiting catalyst and cracked product vapor stream mixture. Such swirl arm arrangements 22 are more fully described in U.S. Pat. No. 4,397,738. The swirl arm arrangement 22 is located in an upper portion of a chamber 24, and a stripping zone 26 is situated in the lower portion of the chamber 24. Catalyst separated by the swirl arm arrangement 22 drops down into the stripping zone 26 (discussed below). The cracked product vapor stream comprising cracked hydrocarbons including light olefins and some catalyst pass, via conduit 28, to cyclones 30. The cyclones 30 remove remaining catalyst particles from the product vapor stream to reduce particle concentrations to very low levels. The product vapor stream then exits the top of the separating vessel 12 through an outlet 32. Catalyst separated by the cyclones 32 return to separating vessel 12 through dipleg conduits 34 into dense bed 36 where it will enter the stripping zone 26 through openings 38.

The stripping zone 26 removes adsorbed hydrocarbons from the surface of catalyst by counter-current contact with steam. The steam enters stripping zone 26 through line 40. Any hydrocarbons removed in the stripping some 26 will flow upwards as described above. The catalyst will drop to a catalyst bed 42 at the bottom of the chamber 24.

Some catalyst from the catalyst bed 42 may be recycled to the riser 16 without first undergoing regeneration. A second portion of the catalyst from the catalyst bed 42 is regenerated in the regenerator 14 before it is returned to the riser 16. The second portion of the of the catalyst from the catalyst bed 42 is transported to the regenerator 14 through a coked catalyst conduit 46 at a rate regulated by control valve 48 for the removal of coke.

On the regeneration side of the process, coked catalyst transferred to the regenerator 14 via the coked catalyst conduit 46 undergoes the typical combustion of coke from the surface of the catalyst particles by contact with an oxygen-containing gas. The oxygen-containing gas enters the bottom of regenerator 14 via an inlet 48 and passes through a dense fluidizing bed of catalyst (not shown). Flue gas consisting primarily of carbon dioxide and perhaps containing carbon monoxide passes upwardly from the dense bed into a dilute phase of regenerator 14. A separator, such as cyclones 50 or other means, remove entrained catalyst particles from the rising flue gas before the flue gas exits the regenerator 14 through an outlet 52. The combustion of coke from the catalyst particles raises the temperatures of the catalyst which is withdrawn from the regenerator 14 in a regenerator standpipe 54.

The regenerator standpipe 54 passes regenerated catalyst from the regenerator 14 into a blending zone 57 at a rate regulated by control valve 56. The flow rate of this catalyst is typically maximized to provide the highest conversion selective to desired gasoline and LPG products at the highest production rate. This catalyst provides most of the heat for the reactor and the flow is limited by the temperature in the riser. Therefore, anything that reduces the heat input to the riser allows for higher catalyst circulation rates, and higher conversions or higher feed rates.

In the blending zone 57, the regenerated catalyst is blended with catalyst directly from the catalyst bed 42. A fluidizing gas is passed into the blending vessel 56 from a conduit 58. The fluidizing gas contacts the catalyst and maintains the catalyst in a fluidized state to rise within the riser 16 and contact the feedstock as described above. Often times, the fluidizing gas is steam. In addition to fluidizing the catalyst, the steam reduces the partial pressure of the hydrocarbons in the riser 16, and helps drive the catalyzed reactions towards desired products (as opposed to undesired byproducts).

In conventional FCC units, a control valve is used to lower the pressure of the steam in the conduit 58 prior to it being passed into the FCC unit 10. The present invention utilizes a turbine 60 in an isentropic expansion to lower the pressure of the steam in conduit 58 prior to passing the steam into the FCC unit 10 which would result in a lower energy content steam versus that controlled by an adiabatic process control valve. An exemplary turbine 60 is shown in FIG. 2.

Figure 2:
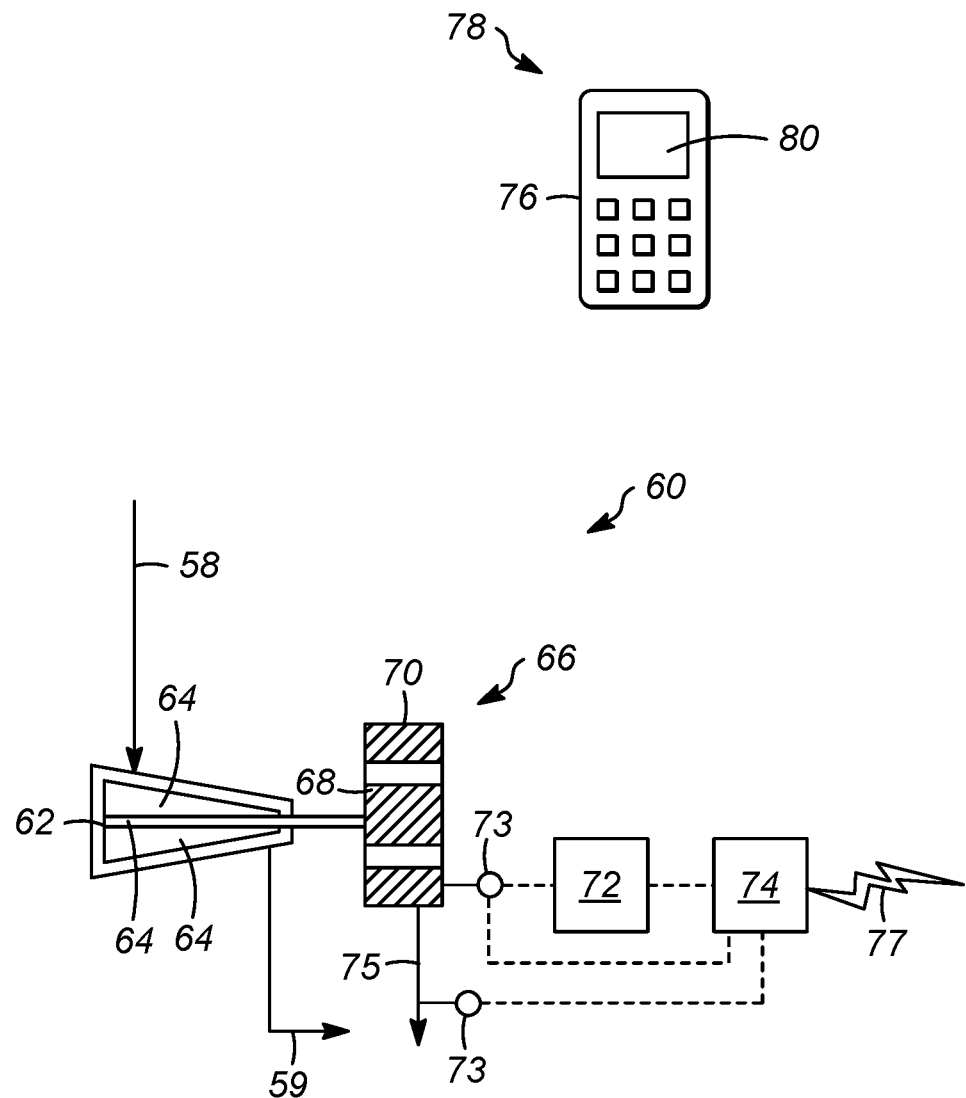
FIG. 2 shows a schematic drawing of a turbine according to one or more aspects of the present invention; and, FIG. 3 shows a hydroprocessing reactor used in accordance with one or more embodiments of the present invention.

Turning to FIG. 2, the turbine 60 includes a turbine wheel 62 with blades 64 configured to transfer, or transmit, rotational movement, created by the flow of the steam passed through the turbine wheel 62, to an electrical generator 66. The electrical generator 66 generally includes a first winding 68, in communication with the turbine wheel 62 and a second winding 70 surrounding the first winding 68. As is known, the rotation of the first winding 68 relative to the second winding 70 will generate an electrical current. Although not depicted as such, the electrical generator 66 could include a permanent magnet instead of one of the windings, 68, 70. Such electrical generators are known in the art.

Additionally, the turbine 60 may include a sensor 73 and an optional processor 72 which may be configured to measure an amount of electricity generated by the turbine 60. A transmitter 74 may be configured to transmit information associated with the amount of electricity generated by the turbine 60 to a computer 76 at a control center 78. In another embodiment, sensor 73 communicates with transmitter 74 without a processor, and transmitter 74 communicates via 77 with recovered electric power measuring system 400 of FIG. 4. Transmitter 74 of FIG. 2 may communicate with receiver 435 of FIG. 4 and such communication may be wired or wireless communication. In yet another embodiment of the invention, the generator 66 of the turbine 60 is connected to electrical power line 75. Sensor 73 may be located on electrical power line 75. Sensor 73 communicates with transmitter 74 without a processor, and transmitter 74 communicates via 77 with recovered electric power measuring system 400 of FIG. 4. Transmitter 74 of FIG. 2 may communicate with receiver 435 of FIG. 4 and such communication may be wired or wireless communication. The sensor may operate to sense other variables beyond the amount of electricity generated by the turbine, or other sensors may be employed in the process to sense a variety of parameters.

The specific configuration of the turbine 60 is not essential to the practicing of the present invention provided that the turbine 60 allows for the desired pressure reduction and conversion of energy from the pressure reduction to electricity. Exemplary turbines and further details are described in U.S. Pat. Nos. 4,625,125, 4,694,189, 4,754,156 and 9,203,969, all of which are incorporated herein by reference.

Accordingly, in some embodiments, the process according to the present invention comprises directing a portion of a gaseous process stream through one or more variable-resistance turbines to control the flowrate of the gas process stream and, optionally, generate electric power therefrom; controlling a pressure and temperature of the gaseous process stream so that the gas exiting the power-recovery turbine remains in the gas phase; and measuring the flowrate or controlling the flowrate or both using a variable nozzle turbine, inlet variable guide vanes, or direct coupled variable electric load, to name a few, to vary the resistance to flow through the turbine. Again, the resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPMs and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPMs can be used.

Thus, the steam from conduit 58 will enter the turbine 60 at an inlet and rotate the turbine wheel 62, thereby reducing the pressure and temperature of the steam and extracting energy from the steam. The lower pressure steam 59, taken from the outlet of the turbine 60, is injected into the riser 16 and reduces a partial pressure of a hydrocarbon vapor in the riser 16. The desired temperature of the steam at the outlet of the turbine 60 is preferably within 15 degrees C. of the dew point of the reduced pressure steam. It is also contemplated that a turbine 60 is utilized in place of control valves in association with the nozzles 19 and/or with the line 40 for the stripping steam.

Figure 3:
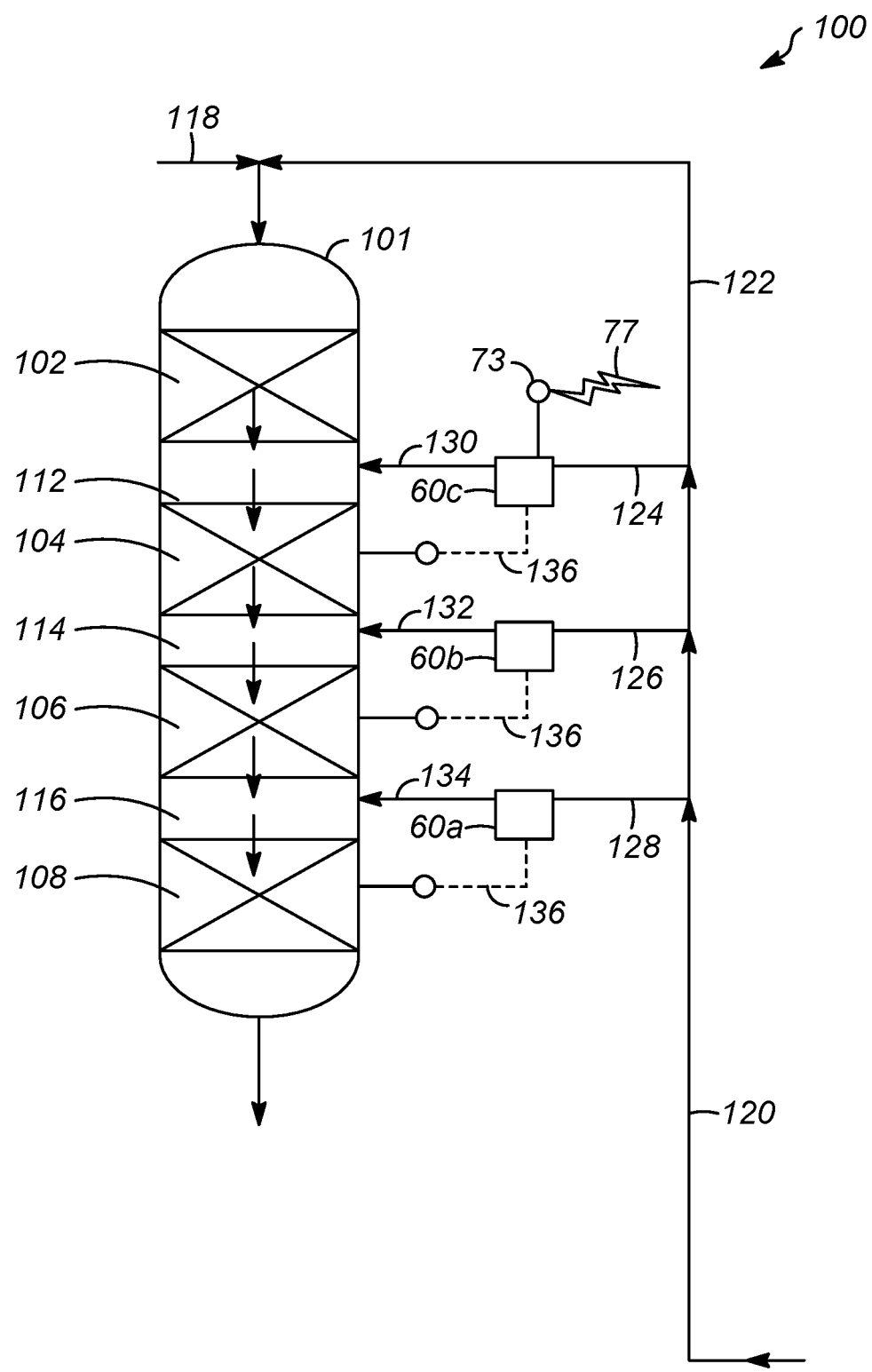

Turning to FIG. 3, it is also contemplated that a turbine is used in association with a quench stream, for example in a hydroprocessing reactor 100. As used herein, the term "hydroprocessing" can refer to processing one or more hydrocarbons in the presence of hydrogen, and can include hydrotreating and/or hydrocracking. As used herein, the term "hydrocracking" can refer to a process breaking or cracking bonds of at least one long-chain hydrocarbon in the presence of hydrogen and at least one catalyst into lower molecular weight hydrocarbons. As used herein, the term "hydrotreating" can refer to a process including contacting a hydrocarbon feedstock with hydrogen gas in the presence of one or more suitable catalysts for the removal of heteroatoms, such as sulfur, nitrogen and metals from a hydrocarbon feedstock. In hydrotreating, hydrocarbons with double and triple bonds may be saturated, and aromatics may also be saturated, as some hydrotreating processes are specifically designed to saturate aromatics.

As depicted in FIG. 3, a hydroprocessing reactor 100 that is used in accordance with the present invention is a multi-fixed bed vessel 101 which, as is known, comprises multiple catalyst beds 102, 104, 106, 108 that are separated from each other by pre-bed spaces 112, 114, 116 (also referred to as quench zones. In an exemplary embodiment, each of the catalyst beds 102, 104, 106, 108 contain a hydrotreating catalyst. Hydrotreating catalysts are well known and typically comprise molybdenum (Mo), tungsten (W), cobalt (Co), and/or nickel (Ni) on a support comprised of γ-alumina. The particular type of hydrotreating catalyst is not necessary for the understanding or practicing of the present invention.

As illustrated, a feed stream 118 is introduced to the hydroprocessing reactor 100. While the feed stream 118 is depicted as being introduced at the top of the vessel 101, it is contemplated that the feed stream 118 is split and injected into the hydroprocessing reactor 100 at multiple positions, such as the pre-bed spaces 112, 114, 116.

A hydrogen-containing stream 120 is also split in a plurality of streams into hydrogen rich streams 122, 124, 126, 128. Preferably, the hydrogen-containing stream 120 is a $H_2$-rich stream. As used herein, the term "rich" means an amount generally of at least 50%, and preferably 70%, by volume, of a compound or class of compounds in a stream. The hydrogen-containing stream 120 may contain recycle hydrogen from the hydroprocessing reactor 100, make-up hydrogen, or a combination of recycle hydrogen and make-up hydrogen.

A first hydrogen rich stream 122 is combined with the feed stream 118 (before or after injection into the vessel 101). The remaining hydrogen rich streams 124, 126, 128 are used as quench streams 130, 132, 134 and injected into the pre-bed spaces 112, 114, 116 of the hydroprocessing reactor 100. In order to reduce the pressure of the quench streams 130, 132, 134, turbines 60a, 60b, 60c are used. These turbines 60a, 60b, 60c are, for example, the turbine 60 shown in FIG. 2. The turbines 60a, 60b, 60c may each be in communication with a temperature sensor 136 configured to measure a temperature of one of the pre-bed spaces 112, 114, 116 and relay the temperature to the turbines 60a, 60b, 60c to adjust the flow of the respective quench streams 130, 132, 134.

Thus, the hydrogen rich streams 124, 126, 128 will enter each of the turbines 60a, 60b, 60c and rotate turbine wheels therein (see, FIG. 2), thereby reducing the pressure and temperature of the hydrogen rich streams 124, 126, 128 and extracting energy from the hydrogen rich streams 124, 126, 128. The lower pressure and temperature quench streams 130, 132, 134 are injected into pre-bed spaces 112, 114, 116 of the reactor 100 and to control the temperature of the catalyst beds 104, 106, 108 within the reactor 100.

In both the FCC unit 10 and the hydroprocessing reactor 100, the flow rate of the stream coming from the turbine 60 can be adjusted to change a process condition of the FCC unit 10 and the hydroprocessing reactor 100. For example, the flow rate of the steam in the riser 16 is adjusted to allow for a change in the hydrocarbon partial pressure within the riser 16 and the catalyst circulation rate. Similarly, the flow rate of the quench streams 130, 132, 134 may be adjusted to change the temperature of the catalyst beds 104, 106, 108 within the reactor 100. Accordingly, in changing these process conditions, it is contemplated that the changes are "slow control" in which the desired change occurs at a relatively slow pace.

Sensor 73 as described in FIG. 2 may be employed with the turbine 60a, 60b, and 60c, of FIG. 3. Sensor 73 is depicted in FIG. 3 with respect to turbine 60a but may be similarly configured for all turbines used in the process. Sensor 73 communicates via 77 with receiver 435 of recovered power measuring system 400 shown in FIG. 4, and 77 may be a wired communication or a wireless communication.

For example, with respect to the hydrotreating reactor 100, it is contemplated that a response time to reach half way (i.e., 50% of a difference) between a new (or target) temperature within the hydrotreating reactor 100 and an original (or starting) temperature within the hydrotreating reactor 100, when the new (or target) temperature differs from the original (or stating) temperature by at least 10%, is at least one second, or even greater, for example, ten seconds. In other words, when the new temperature of the reactor differs from the current temperature within the reactor, the turbine provides a process that takes at least one second, at least ten seconds, at least one minute, at least ten minutes, or an hour or more, for half of the change to completed.

Similarly, with respect to the FCC unit 10, it is contemplated that the response time to reach half way (i.e., 50% of a difference) between a new (or target) hydrocarbon partial pressure within the FCC unit 10 and an original (or stating) hydrocarbon partial pressure within the FCC unit 10, when the new (or target) hydrocarbon partial pressure differs from the original (or stating) hydrocarbon partial pressure by at least 10%, is also at least one second, at least ten seconds, at least one minute, at least ten minutes, or an hour or more. One of ordinary skill in the art will be able to determine the process conditions and response time for the dynamic processes associated with the present invention.

Thus, if slow control response of the turbine is an issue then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, is of at least one second, or even greater, for example, ten seconds, at least one minute, at least ten minutes, or an hour or more, for half of the change to completed.

It is further contemplated that the chemical processing units used in the present processes, such as the FCC unit 10 or the hydrotreating reactor 100, utilizes a process control system.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor reading information from, and writing information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information relative to an amount of electricity generated by the turbines 60. It is contemplated that the turbine determines the amount of electricity it has generated, or alternatively, the process control system receiving the information determines the amount of electricity that has been generated. In either configuration, the amount of the electricity generated by the turbines 60 is displayed on at least one display screen 80 (for example in communication with the computer 76 in the control center 78). If the processing unit comprises a plurality of turbines 60, it is further contemplated that the processing control system receives information associated with the amount of electricity generated by each of the turbines 60. The processing control system determines a total power generated based upon the information associated with the each of the turbines 60 and displays that the total power generated. The total power generated may be displayed instead of or in conjunction with the display of the power generated by individual turbines 60.

As discussed above, the recovery of the electricity is based upon the need to remove energy form the streams that has already been added to the streams in the processing units. Thus, it is contemplated that the processes according to the present invention provide for the various process conditions associated with the processing units to be adjusted into order to lower the energy added to the steam initially. It is contemplated that the process control system receives information associated with the throughput of the processing unit, and determines a target power generated value for the turbines 60, since the electricity represents energy that is typically added to the overall processing unit. The determination of the target power generated value may be done when the electricity is at or near a predetermined level. Thus, the process control system will analyze one or more changes to the various process conditions associated with the processing unit to lower the amount of energy recovered by the turbines 60. Preferably, the process conditions are adjusted without adjusting the throughput of the processing unit. This allows for the processing unit to have the same output, but with a lower operating input. The process control software may calculate and display the difference between the target power generated value and the total power generated on the at least one display screen 80.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or received, or recorded, by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or received or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

By way of example, sensors and measurements as to the electricity in an electrical power line from a generator of a turbine may be employed. Similarly, such a sensor may be associated with the turbine in general. Sensors and measurements of the vapor streams engaging with the turbine may be employed. Sensors and measurements of the reactor may be employed. Sensors and measurements of temperature or hydrocarbon vapor pressure of the reactor may be employed. Information as to the day and time may be employed. Control of the turbine may be employed. Control of the vapor stream engaging with the turbine may be employed. Such control of the turbine or of the vapor stream may be correlated to the sensing or measurement of one or more parameters. The data sensed and received may be used as the basis for adjustment or control of a variety of process variables and conditions, the data may provide regulatory information, predictive information. Examples include information as to catalyst deactivation, catalyst performance, catalyst life, and equipment maintenance. The data may be used to determine where to employ the recovered electric power.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 4:
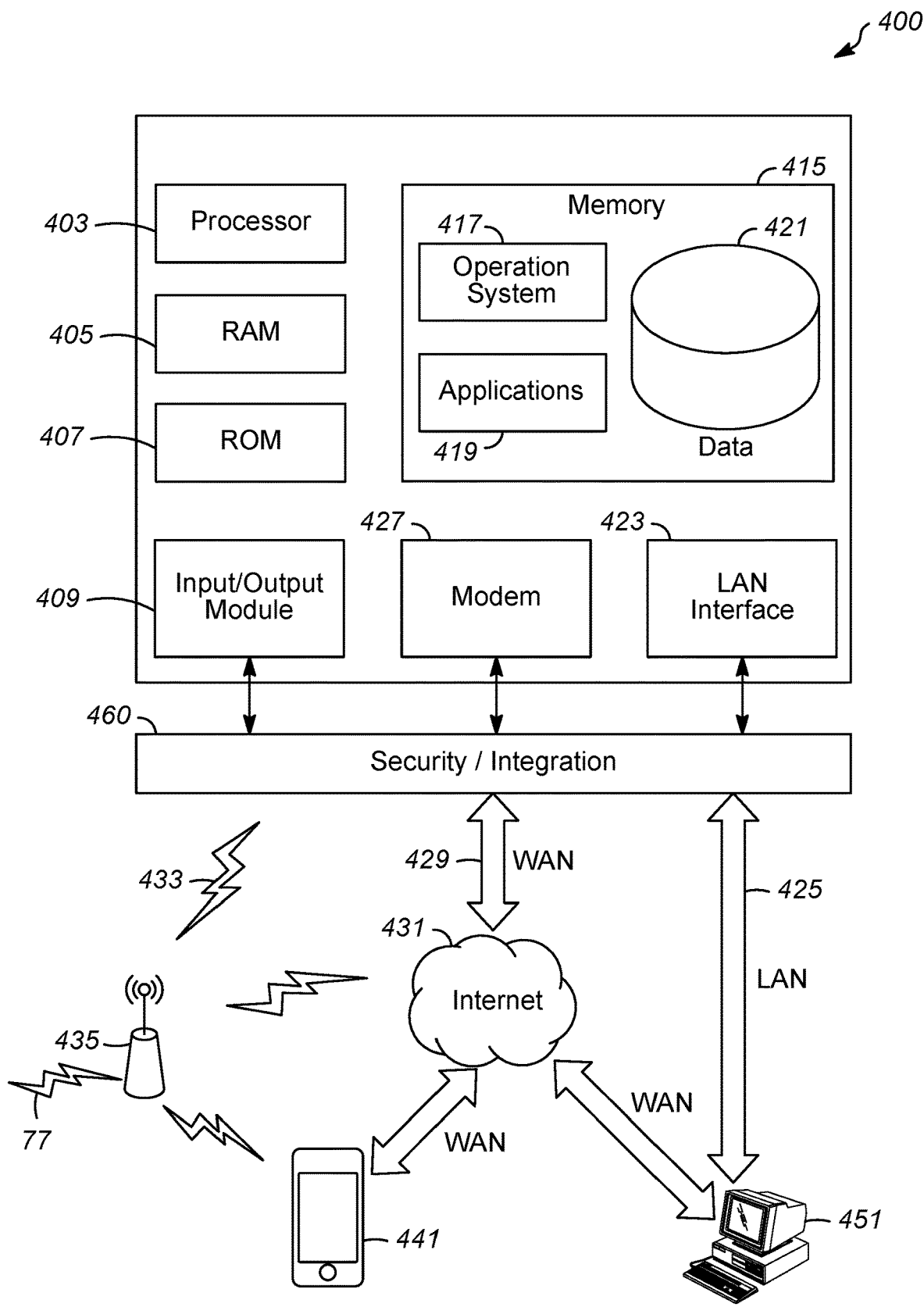
FIG. 4 shows a network environment and computing system that may be used to implement embodiments of the invention.

FIG. 4 illustrates a block diagram of one embodiment of a recovered electric power measuring system 400 that may be used according to one or more illustrative embodiments of the disclosure. The recovered electric power measuring system 400 may have a processor 403 for controlling overall operation of the recovered electric power measuring system 400 and its associated components, including RAM 405, ROM 407, input/output module 409, and memory 415. The recovered electric power measuring system 400, along with one or more additional devices (e.g., terminals 441, 451) may correspond to any of multiple systems or devices, such as mobile computing devices (e.g., smartphones, smart terminals, tablets, and the like) and/or refinery-based computing devices, configured as described herein for collecting and analyzing sensor data from devices associated with lines, vessels, or devices of one or more units, pertaining to operation or parameter of the one or more units.

Input/Output (I/O) 409 may include a microphone, keypad, touch screen, and/or stylus through which a user of the recovered electric power measuring system 400 may provide input, and may also include one or more of a speaker for providing audio output and a video display device for providing textual, audiovisual and/or graphical output. Software may be stored within memory 415 and/or storage to provide instructions to processor 403 for enabling recovered electric power measuring system 400 to perform various functions. For example, memory 415 may store software used by the recovered electric power measuring system 400, such as an operating system 417, application programs 419, and an associated internal database 421. Processor 403 and its associated components may allow the recovered electric power measuring system 400 to execute a series of computer-readable instructions to transmit or receive data, analyze data, and store analyzed data.

The recovered electric power measuring system 400 may operate in a networked environment supporting connections to one or more remote computers, such as terminals/devices 441 and 451. Recovered electric power measuring system 400, and related terminals/devices 441 and 451, may include devices or sensors associated with equipment, streams, or materials of a process employing streams and a reactor, including devices on-line or outside of equipment, streams, or materials, that are configured to receive and process data. Thus, the recovered electric power measuring system 400 and terminals/devices 441 and 451 may each include personal computers (e.g., laptop, desktop, or tablet computers), servers (e.g., web servers, database servers), sensors, measurement devices, communication systems, or mobile communication devices (e.g., mobile phones, portable computing devices, and the like), and may include some or all of the elements described above with respect to the recovered electric power measuring system 400.

The network connections depicted in FIG. 4 include a local area network (LAN) 425 and a wide area network (WAN) 429, and a wireless telecommunications network 433, but may also include other networks. When used in a LAN networking environment, the recovered electric power measuring system 400 may be connected to the LAN 425 through a network interface or adapter 423. When used in a WAN networking environment, the recovered electric power measuring system 400 may include a modem 427 or other means for establishing communications over the WAN 429, such as network 431 (e.g., the Internet). When used in a wireless telecommunications network 433, the recovered electric power measuring system 400 may include one or more transceivers, digital signal processors, and additional circuitry and software for communicating with wireless computing devices 441 (e.g., mobile phones, short-range communication systems, telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices recovered electric power measuring system components described herein may be configured to communicate using any of these network protocols or technologies.

Also illustrated in FIG. 4 is a security and integration layer 460, through which communications may be sent and managed between the recovered electric power measuring system 400 (e.g., a user's personal mobile device, a refinery-based system, external server, etc.) and the remote devices (441 and 451) and remote networks (425, 429, and 433). The security and integration layer 460 may comprise one or more separate computing devices, such as web servers, authentication servers, and/or various networking components (e.g., firewalls, routers, gateways, load balancers, etc.), having some or all of the elements described above with respect to recovered electric power measuring system 400. As an example, a security and integration layer 460 of a mobile computing device, refinery-based device, or a server operated by a provider, an institution, governmental entity, or other organization, may comprise a set of web application servers configured to use secure protocols and to insulate the recovered electric power measuring system 400 from external devices 441 and 451. In some cases, the security and integration layer 460 may correspond to a set of dedicated hardware and/or software operating at the same physical location and under the control of same entities as recovered electric power measuring system 400. For example, layer 460 may correspond to one or more dedicated web servers and network hardware in an organizational datacenter or in a cloud infrastructure supporting a cloud-based recovered electric power measuring system. In other examples, the security and integration layer 460 may correspond to separate hardware and software components which may be operated at a separate physical location and/or by a separate entity. It is envisioned that the security and integration layer may be positioned at different locations within the system, and that different components of the system may be positioned at different points with respect to the security and integration layer.

As discussed below, the data transferred to and from various components of recovered electric power measuring system 400 may include secure and sensitive data, such as measurement data, turbine data, turbine generator data, date and time data, reactor data, catalyst data, quantitative data, data as to electricity in an electrical power line, and instructions. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the recovered electric power measuring system 400, by using the security and integration layer 460 to authenticate users and restrict access to unknown or unauthorized users. In various implementations, security and integration layer 460 may provide, for example, a file-based integration scheme or a service-based integration scheme for transmitting data between the various devices in the recovered electric power measuring system 400. Data may be transmitted through the security and integration layer 460, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the recovered electric power measuring system 400 and/or the security and integration layer 460. The web services may be accessed by authorized external devices and users to support input, extraction, and manipulation of the data (e.g., sensing data, concentration data, flow control data, etc.) between the recovered electric power measuring system 400. Web services built to support the recovered electric power measuring system 400 may be cross-domain and/or cross-platform, and may be built for enterprise use. Such web services may be developed in accordance with various web service standards, such as the Web Service Interoperability (WS-I) guidelines. In some examples, a flow control data and/or concentration data web service may be implemented in the security and integration layer 460 using the Secure Sockets Layer (SSL) or Transport Layer Security (TLS) protocol to provide secure connections between servers (e.g., the recovered electric power measuring system 400) and various clients 441 and 451 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 460 may include specialized hardware for providing secure web services. For example, secure network appliances in the security and integration layer 460 may include built-in features such as hardware-accelerated SSL and HTTPS, WS-Security, and firewalls. Such specialized hardware may be installed and configured in the security and integration layer 460 in front of the web servers, so that any external devices may communicate directly with the specialized hardware.

In some aspects, various elements within memory 415 or other components in recovered electric power measuring system 400, may include one or more caches, for example, CPU caches used by the processing unit 403, page caches used by the operating system 417, disk caches of a hard drive, and/or database caches used to cache content from database 421. For embodiments including a CPU cache, the CPU cache may be used by one or more processors in the processing unit 403 to reduce memory latency and access time. In such examples, a processor 403 may retrieve data from or write data to the CPU cache rather than reading/writing to memory 415, which may improve the speed of these operations. In some examples, a database cache may be created in which certain data from a database 421 (e.g., an operating parameter database, a concentration database, correlation database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving data, collecting data, receiving data, recording data, processing data, and analyzing data, such as faster response times and less dependence on network conditions when transmitting/receiving data.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi33, and WiMAX, is presumed, and the various computer devices and system components described herein may be configured to communicate using any of these network protocols or technologies.

Additionally, one or more application programs 419 may be used by the recovered electric power measuring system 400 (e.g., flow control software applications, device configuration software applications, and the like), including computer executable instructions for receiving and storing data from refinery-based systems, and/or mobile computing devices, analyzing the data to determine the amount of sulfur removed in the sulfur stripping vessel, analyzing data to determine the setting or adjustment to the flow of the gas stream, determining and configuring the mobile computing device based on the retrieved and analyzed data, and/or performing other related functions as described herein.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

EXAMPLES

In simulated examples of the present invention, it was determined that by using a turbine 60 instead of a control valve, the quench temperature for a hydroprocessing reactor could be reduced by 5-10° C. It is believed that this could reduce the hydrogen demand requirements for the quench stream by up to 5% or alternatively debottleneck the hydrocarbon feed rate by a similar amount. Another option would be to use this reduction in the quench hydrogen demand to shift hydrogen to the reactor inlet. Additionally, or alternatively, the reduction in the quench hydrogen demand reduces the power consumption of the recycle gas compressor used in association the hydrogen containing gas stream. For an FCC unit, it was determined that by using a turbine 60 instead of a control valve, the catalyst to oil (feedstock) ratio could be increased with an increase in yield (as opposed to increase in undesired byproducts) which increases the profitability of the FCC unit or allow for more feed while maintaining a constant catalyst to oil ratio.

Thus, not only does the present invention recover energy that is typically lost, the present invention provides advantages to the underlying process conditions of the processing unit.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While the following is described in conjunction with specific embodiments, it will be understood that this description is intended to illustrate and not limit the scope of the preceding description and the appended claims.

A first embodiment of the invention is a process for reducing pressure of a vapor stream used for reducing a temperature, heat load, or hydrocarbon partial pressure in a reactor, the process comprising reducing a pressure of a vapor stream with a turbine to provide a lower pressure vapor stream; rotating a turbine wheel within the turbine, injecting the lower pressure vapor stream into a reactor and reducing a temperature in the reactor or reducing a partial pressure of a hydrocarbon vapor in the reactor. An embodiment of the invention is one, any or all of prior embodiments in this paragraph up through the first embodiment in this paragraph further comprising increasing the feed rate to the reactor by relaxing a high temperature bottleneck by extracting energy from the vapor stream. An embodiment of the invention is one, any or all of prior embodiments in this paragraph up through the first embodiment in this paragraph wherein the turbine wheel is configured to transmit rotational movement to an electrical generator, and the process further comprising generating electricity with the turbine. An embodiment of the invention is one, any or all of prior embodiments in this paragraph up through the first embodiment in this paragraph further comprising receiving information from the turbine relative to an amount of electricity generated by the turbine; and, displaying the amount of electricity generated by the turbine on at least one display screen. An embodiment of the invention is one, any or all of prior embodiments in this paragraph up through the first embodiment in this paragraph further comprising maintaining a throughput of the reactor while adjusting at least one process parameter of the reactor. An embodiment of the invention is one, any or all of prior embodiments in this paragraph up through the first embodiment in this paragraph, wherein the reactor comprises a plurality of turbines each configured to generate electricity, and wherein the process comprises determining a total power generated based upon the amount of electricity generated by the turbines; and, displaying the total power generated value on the at least one display screen. An embodiment of the invention is one, any or all of prior embodiments in this paragraph up through the first embodiment in this paragraph wherein the reactor comprises an FCC reactor, and wherein the vapor stream comprises a steam stream. An embodiment of the invention is one, any or all of prior embodiments in this paragraph up through the first embodiment in this paragraph wherein the reactor comprises a hydroprocessing reactor, and wherein the vapor stream comprises a hydrogen stream.

A second embodiment of the invention is a process for reducing pressure of a vapor stream used for adjusting a partial pressure of a hydrocarbon vapor, the process comprising providing a vapor stream comprising steam; passing the vapor stream through a turbine, the turbine comprising a turbine wheel within the turbine; and, reducing a partial pressure of a hydrocarbon vapor by mixing the reduced pressure vapor stream with the hydrocarbon vapor. An embodiment of the invention is one, any or all of prior embodiments in this paragraph up through the second embodiment in this paragraph, wherein the reduced pressure vapor stream is injected into an FCC reactor to reduce the partial pressure of the hydrocarbon vapor in the FCC reactor. An embodiment of the invention is one, any or all of prior embodiments in this paragraph up through the second embodiment in this paragraph further comprising recovering electricity generated with the turbine. An embodiment of the invention is one, any or all of prior embodiments in this paragraph up through the second embodiment in this paragraph further comprising adjusting one or more process conditions for the FCC reactor based upon a cooling duty provided by the turbine. An embodiment of the invention is one, any or all of prior embodiments in this paragraph up through the second embodiment in this paragraph, wherein the outlet temperature is within 15 degrees C. of the dew point of the reduced pressure vapor stream. An embodiment of the invention is one, any or all of prior embodiments in this paragraph up through the second embodiment in this paragraph, wherein a response time to reach 50% of a difference between the partial pressure and an original partial pressure, when the partial pressure varies from the original partial pressure by at least 10%, is at least one second. An embodiment of the invention is one, any or all of prior embodiments in this paragraph up through the second embodiment in this paragraph, wherein a change response time to reach 50% of a difference between the partial pressure and an original partial pressure, when the partial pressure varies from the original partial pressure by at least 10%, is at least ten seconds.

A third embodiment of the invention is a process for reducing pressure of a vapor stream used as a quench stream, the process comprising providing a vapor stream comprising hydrogen; passing the vapor stream through a turbine, the turbine comprising a turbine wheel within the turbine; recovering a reduced pressure vapor stream from the turbine; and, controlling a temperature within a reactor with the reduced pressure vapor stream from the turbine. An embodiment of the invention is one, any or all of prior embodiments in this paragraph up through the third embodiment in this paragraph wherein the reactor comprises a hydroprocessing reactor. An embodiment of the invention is one, any or all of prior embodiments in this paragraph up through the third embodiment in this paragraph further comprising determining a cooling duty of the turbine; and, adjusting one or more process conditions for the hydroprocessing reactor based upon the cooling duty of the turbine. An embodiment of the invention is one, any or all of prior embodiments in this paragraph up through the third embodiment in this paragraph further comprising adjusting a process condition of the vapor stream to achieve a desired hydroprocessing reactor temperature. An embodiment of the invention is one, any or all of prior embodiments in this paragraph up through the third embodiment in this paragraph, wherein the reduced pressure vapor stream is injected into the reactor to adjust a temperature of at least one catalyst bed. An embodiment of the invention is one, any or all of prior embodiments in this paragraph up through the third embodiment in this paragraph, wherein a response time to reach 50% of a difference between the temperature within the reactor and an original temperature within the reactor, when the temperature within the reactor varies from the original temperature within the reactor by at least 10%, is at least one second. An embodiment of the invention is one, any or all of prior embodiments in this paragraph up through the third embodiment in this paragraph, wherein a response time to reach 50% of a difference between the temperature within the reactor and an original temperature within the reactor, when the temperature within the reactor varies from the original temperature within the reactor by at least 10%, is at least ten seconds. An embodiment of the invention is one, any or all of prior embodiments in this paragraph up through the third embodiment in this paragraph further comprising recovering electricity generated with the turbine.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a recovered electric power measuring system comprising (a) at least one processor; (b) at least one memory storing computer-executable instructions; and (c) at least one receiver configured to receive data from a sensor on an electrical powerline connected to an electrical generator which is connected to a turbine, the turbine in fluid communication with a vapor stream wherein the turbine reduces the pressure of the vapor stream and the resulting lower pressure vapor stream reduces a partial pressure of a hydrocarbon vapor or is injected into a reactor to reduce a temperature in the reactor. An embodiment of the invention is one, any or all of prior embodiments in this paragraph up through the first embodiment in this paragraph wherein the at least one receiver if further configures to receive data on at least one of temperature or hydrogen partial pressure or date or time. An embodiment of the invention is one, any or all of prior embodiments in this paragraph up through the first embodiment in this paragraph further comprising an Input/Output device to collect the data. An embodiment of the invention is one, any or all of prior embodiments in this paragraph up through the first embodiment in this paragraph wherein the processor is configured to evaluate the data. An embodiment of the invention is one, any or all of prior embodiments in this paragraph up through the first embodiment in this paragraph wherein the processor is configured to correlate the data. An embodiment of the invention is one, any or all of prior embodiments in this paragraph up through the first embodiment in this paragraph further comprising a transmitter to transmit a signal to the recovered electric power measuring system. An embodiment of the invention is one, any or all of prior embodiments in this paragraph up through the first embodiment in this paragraph wherein the signal comprises instructions. An embodiment of the invention is one, any or all of prior embodiments in this paragraph up through the first embodiment in this paragraph wherein the signal is transmitted to the turbine. An embodiment of the invention is one, any or all of prior embodiments in this paragraph up through the first embodiment in this paragraph further comprising collecting data from multiple systems wherein one system is the recovered electric power measuring system. An embodiment of the invention is one, any or all of prior embodiments in this paragraph up through the first embodiment in this paragraph wherein the processor is configured to generate predictive information. An embodiment of the invention is one, any or all of prior embodiments in this paragraph up through the first embodiment in this paragraph wherein the processor is configured to generate regulatory reporting information. An embodiment of the invention is one, any or all of prior embodiments in this paragraph up through the first embodiment in this paragraph wherein the turbine comprises a sensor. An embodiment of the invention is one, any or all of prior embodiments in this paragraph up through the first embodiment in this paragraph wherein the processor is configured to generate quantitative information. An embodiment of the invention is one, any or all of prior embodiments in this paragraph up through the first embodiment in this paragraph wherein the processor is further configured to generate quantitative information and further to correlate the quantitative information with the data of time or day or both.

A second embodiment of the invention is a method for collecting data from a recovered electric power measuring system, the method comprising receiving data from a sensor on an electrical powerline connected to a generator of a turbine, the turbine in fluid communication with a vapor stream wherein the turbine reduces the pressure of the vapor stream and the resulting lower pressure vapor stream reduces a partial pressure of a hydrocarbon vapor or is injected into a reactor to reduce a temperature in the reactor. An embodiment of the invention is one, any or all of prior embodiments in this paragraph up through the second embodiment in this paragraph further comprising at least one of displaying or transmitting or analyzing the received data. An embodiment of the invention is one, any or all of prior embodiments in this paragraph up through the second embodiment in this paragraph further comprising analyzing the received data to generate at least one instruction and transmitting the at least one instruction. An embodiment of the invention is one, any or all of prior embodiments in this paragraph up through the second embodiment in this paragraph further comprising analyzing the received data and generating predictive information. An embodiment of the invention is one, any or all of prior embodiments in this paragraph up through the second embodiment in this paragraph wherein the predictive information comprises at least one of catalyst performance or catalyst selectivity or catalyst life or equipment maintenance. An embodiment of the invention is one, any or all of prior embodiments in this paragraph up through the second embodiment in this paragraph further comprising analyzing the received data and generating quantitative information.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A recovered electric power measuring system comprising:
   (a) at least one processor;
   (b) at least one memory storing computer-executable instructions; and
   (c) at least one receiver configured to
      receive data from a sensor on an electrical powerline connected to an electrical generator which is connected to a turbine, the turbine in fluid communication with a vapor stream wherein the turbine reduces the pressure of the vapor stream and the resulting lower pressure vapor stream is injected into a reactor to reduce a temperature in the reactor,
      wherein the computer-executable instructions cause the processor to transmit a signal to adjust a resistance in the turbine based on a temperature measured in the reactor.

2. The system of claim 1 wherein the at least one receiver is further configured to receive data on at least one of temperature or date or time.

3. The system of claim 2 wherein the processor is further configured to generate quantitative information and further to correlate the quantitative information with the data of time or day or both.

4. The system of claim 1 further comprising an Input/Output device to collect the data.

5. The system of claim 1 wherein the processor is configured to evaluate the data.

6. The system of claim 1 wherein the processor is configured to correlate the data.

7. The system of claim 1 further comprising a transmitter to transmit the signal to the recovered electric power measuring system.

8. The system of claim 1 further comprising collecting data from multiple systems wherein one system is the recovered electric power measuring system.

9. The system of claim 1 wherein the processor is configured to generate predictive information.

10. The system of claim 1 wherein the processor is configured to generate regulatory reporting information.

11. The system of claim 1 wherein the turbine comprises a sensor.

12. The system of claim 1 wherein the processor is configured to generate quantitative information.

13. A method for collecting data from a recovered electric power measuring system, the method comprising:
   receiving data from a sensor on an electrical powerline connected to a generator of a turbine, the turbine in fluid communication with a vapor stream wherein the turbine reduces the pressure of the vapor stream and the resulting lower pressure vapor stream reduces a partial pressure of a hydrocarbon vapor or is injected into a reactor to reduce a temperature in the reactor; and,
   transmitting, by computer-executable instructions, a signal to adjust a resistance in the turbine based on a temperature measured in the reactor.

14. The method of claim 13 further comprising at least one of displaying or transmitting or analyzing the received data.

15. The method of claim 13 further comprising analyzing the received data to generate the signal.

16. The method of claim 13 further comprising analyzing the received data and generating predictive information.

17. The method of claim 16 wherein the predictive information comprises at least one of catalyst performance or catalyst selectivity or catalyst life or equipment maintenance.

18. The method of claim 13 further comprising analyzing the received data and generating quantitative information.

* * * * *